July 14, 1936.  J. G. SHODRON  2,047,334

APPARATUS FOR STORAGE AND VENTILATION OF HAY

Original Filed Jan. 7, 1933  2 Sheets-Sheet 1

Inventor
JOHN G. SHODRON,
By Toulmin & Toulmin
Attorneys

July 14, 1936.    J. G. SHODRON    2,047,334
APPARATUS FOR STORAGE AND VENTILATION OF HAY
Original Filed Jan. 7, 1933    2 Sheets-Sheet 2
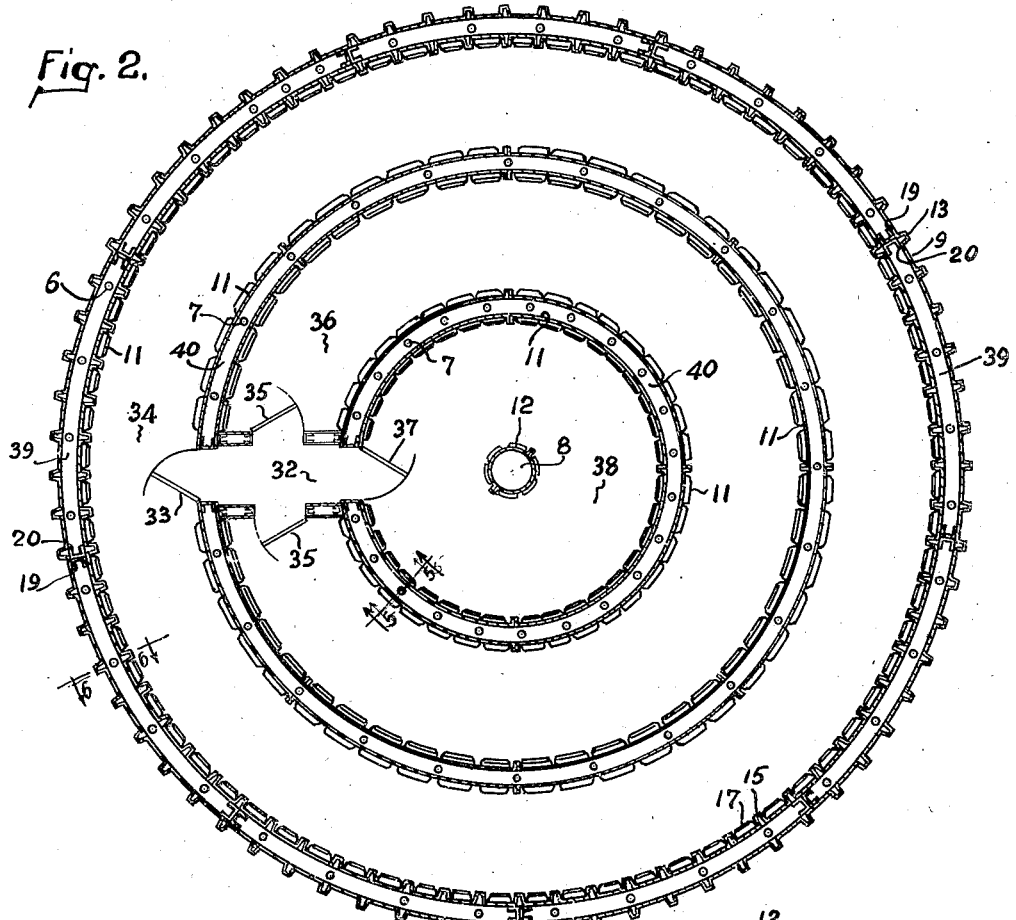
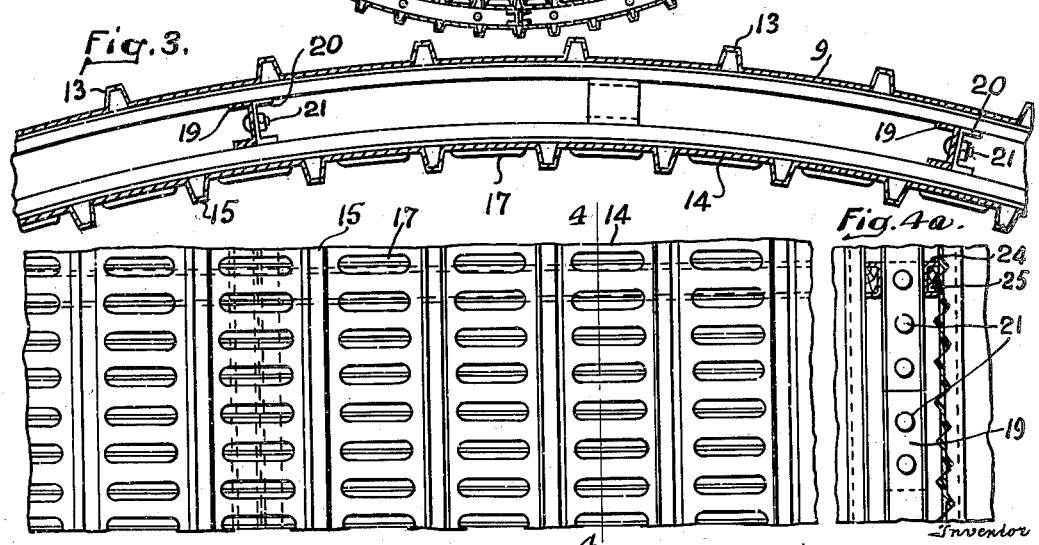
Inventor
JOHN G. SHODRON,
BY Toulmin & Toulmin
Attorneys Patented July 14, 1936

2,047,334

UNITED STATES PATENT OFFICE 2,047,334

APPARATUS FOR STORAGE AND VENTILATION OF HAY

John G. Shodron, Fort Atkinson, Wis., assignor to James Manufacturing Company, Fort Atkinson, Wis., a corporation of Wisconsin Original application January 7, 1933, Serial No. 650,731. Divided and this application August 31, 1933, Serial No. 687,626

4 Claims. (Cl. 189—3)

This invention relates to improvements in containers for hay, and has for its object to provide improved means for supporting the walls of a container, and provide passageways for the application of air to the hay.

It is particularly the object of this invention to provide a plurality of girt members for supporting the sides, and to provide between the sides, in cooperation with uprights, passageways for the circulation of air about the hay and through the hay.

It is also an object of this invention to provide, in connection with a plurality of uprights and girt members attached to the uprights, means for forming a stop by which the air is diverted from passageways formed between the uprights so that the air will be distributed through the hay contained in a container.

These and other advantages will appear from the following description taken in connection with the drawings.

This is a division of my heretofore copending application, Ser. No. 650,731, filed January 7, 1933, on which has now issued Letters Patent No. 1,981,434, dated November 20, 1934.

Referring to the drawings:

Figure 2 is a section on the line 2—2 of Figure 1.

Figure 3 is an enlarged detail taken on the line 3—3 of Figure 1, with the walls corrugated.

Figure 4 is an elevation showing the nature of the foraminous wall structure.

Figure 4a is a section on the line 4—4 of Figure 4.

Figure 1:
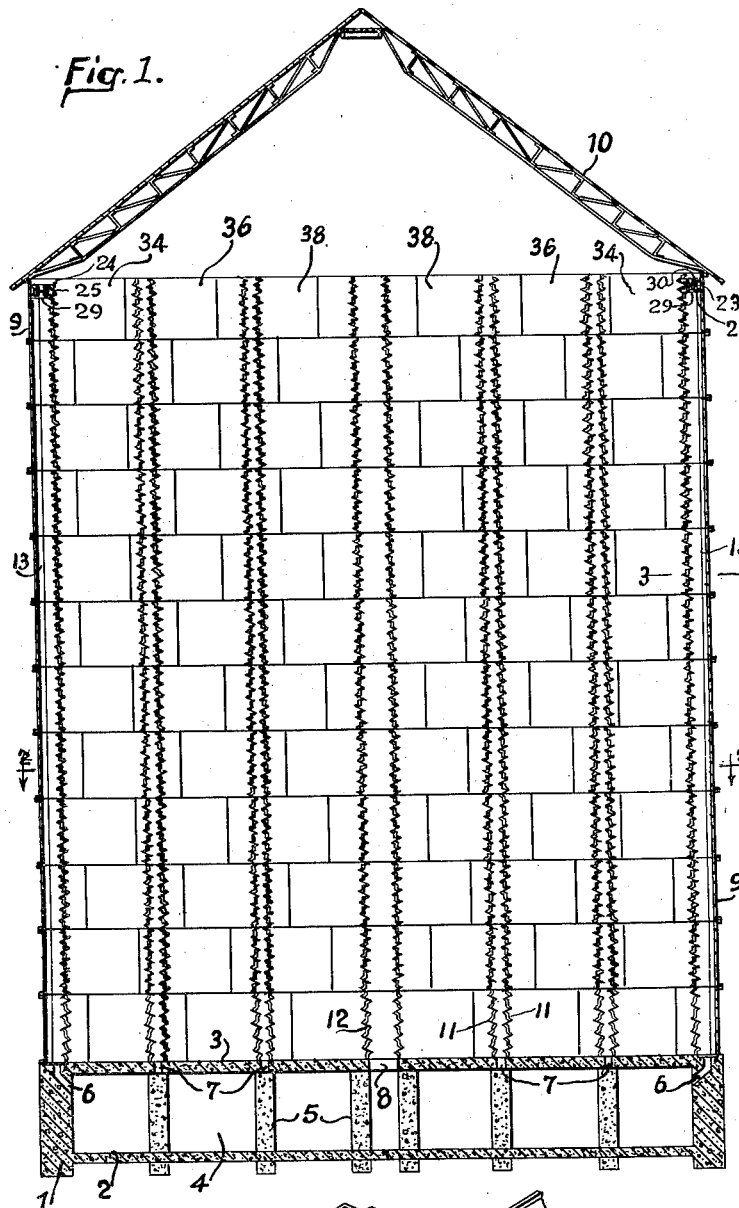
Figure 1 is a vertical section through a container provided with a foraminous wall spaced from a continuous exterior wall, and interior spaced foraminous walls spaced from one another, all of said walls forming ventilating passageways.
Figure 5:
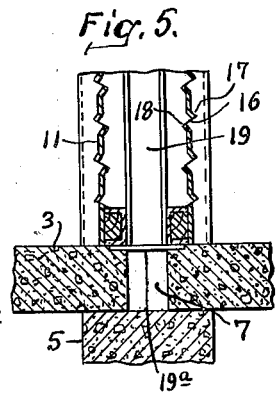
Figure 5 is a section on the line 5—5 of Figure 2, showing the perforated wall construction adjacent the floor of the container.
Figure 6:
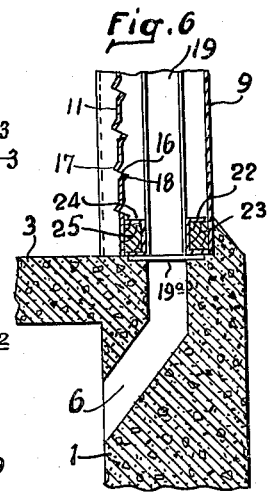
Figure 6 is a section on the line 6—6 of Figure 2, showing the outer wall structure adjacent the foundation wall.
Figure 7:
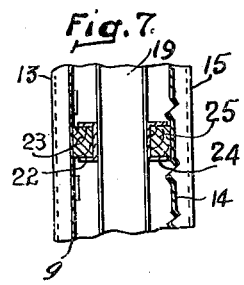
Figure 7 is a vertical section through a part of the wall intermediate the top and bottom, showing one of the uprights and the girts attached thereto in section.

The foundation structure consists of a foundation or cellar wall 1, a cellar floor 2, and a container floor 3 forming an air chamber 4. The interior of the container floor is supported by means of pillars 5. These pillars and wall and floor are composed of any suitable material, such as concrete.

Extending from the air chamber through the top of the wall is a plurality of air ducts 6, while extending through the floor above the various parts of the chamber is a plurality of circularly arranged air holes 7. These holes are arranged in concentric circles about a central hole 8, larger in size than the holes 7. On the cellar wall is a container 9, which has thereon a roof structure 10.

Figure 10:
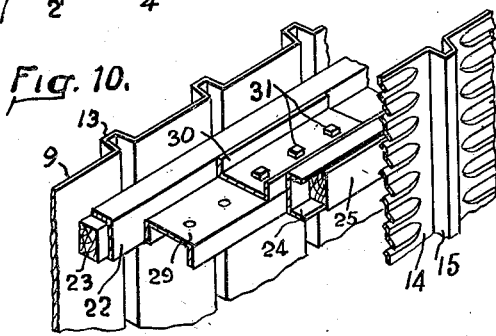
Figure 10 is a perspective view of a fragment of the upper end of the outer wall structure, showing the outer continuous wall member and inner foraminous wall member adjacent thereto, the two girt members, one for each wall member, and an intervening stop to form a closure to prevent the passing of air out at the top of the air passageways formed by the two wall members.

Arranged within the container and immediately above the pillars are pairs of circular spaced foraminous partitions 11. Each pair of partitions is arranged around one set of circularly arranged holes. Around the central hole 8 is a ventilating tube 12. The outer wall of the container may have a plain surface or it may have a plurality of vertically disposed, laterally spaced corrugations 13, as shown in Figure 10. The foraminous walls 14 may have a plurality of similarly spaced vertical corrugations 15. Between these corrugations the foraminous walls have a plurality of horizontally disposed slots 16. Each slot has an overhanging, inwardly projecting lip 17, which overhangs the slot and tends to force the air passing between two adjacent corrugated walls or between a corrugated wall and an outside wall, toward the bottom of the container. The part 18 of the foraminous wall immediately below the slot is pressed outwardly and tends to form with the lip a substantially straight, downwardly and inwardly directed air passageway.

Supported on the wall 1 and resting upon plates 19a is a plurality of vertically disposed column members 19, composed of channel irons or U-shaped beams. These beams may be one continuous member or a plurality of members set one upon the other and connected by means of a connecting member 20, as is clearly shown in Figure 3. This connecting member is U-shaped and is connected to the vertical members at their backs by means of bolts 21.

Figure 8:
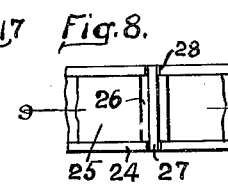
Figure 8 shows a fragmentary part of one of the girt members with the wooden strip therein.
Figure 9:
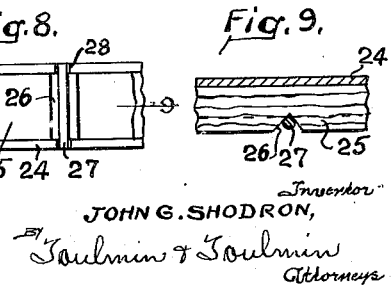
Figure 9 is a section on the line 9—9 of Figure 8.

Extending around the outside of these columns is a plurality of outer girts 22, which are U-shaped and provide a trough or seat for wooden fillers 23. These girt members are attached to the columns in any suitable manner. They may be welded, riveted or bolted thereto. Adjacent each outer girt member is an inner girt member 24, similar in shape, to provide a trough or seat for wooden fillers 25. These girts are attached to the columns in the same manner as the girts 22. The fillers are held in the girt members by means of pins 27, supported in notches 26, and passing through the material of the fillers. In Figure 8 these pins are indicated at 28 as being welded to the girts. Other means of attachment may be used.

Between the outside wall member of the container and the adjacent foraminous wall member, at the top of the container, is a filler member 29 composed of one or more U-shaped plates connected at their ends by means of connector plates 30 and bolts 31. This filler member rests on top of the columns 19 and forms stops for the upper ends of the passageways formed by the columns and the side members of the outer wall structure. Between the filler member and each adjacent wall is the girt and its wooden filler. These wooden fillers serve as means by which the wall members are attached to the column members for forming the complete wall structure.

From an examination of Figure 2 it will be observed that there is a plurality of circular hay containing chambers 34, 36, and 38. These chambers are separated from one another by partitions, each partition having its upright columns with the girts arranged about them supporting foraminous walls spaced from each other. These foraminous walls together with the columns form vertical air passageways from which the air passes through the slots into the annular chambers.

These partitions are similar in structure to the outside wall structure with the exception that in the outside wall structure there is a continuous, unforaminous outer wall. In the partitions the holes 7 lead into the air spaces between the foraminous wall parts thereof, while the ducts 6 lead into the passageways formed by the outer wall members and its adjacent foraminous wall member.

These annular chambers are connected by means of a corridor 32, which has a door 33 for closing an entrance or passageway from the chamber 34 into the corridor. Leading from the corridor are two passageways into the chamber 36, closed by means of doors 35. This corridor has a passageway into the chamber 38, closed by means of a door 37. The air passageways formed by the outer continuous wall member and the adjacent foraminous wall member, together with the columns, are indicated by the numeral 39, while the passageways leading from the holes 7, between the two adjacent foraminous walls forming a partition, are indicated by the numeral 40.

It will be observed that the wall structures are supported by circularly arranged columns, around which are girts to which the wall members are attached. This arrangement is true not only of the outside wall structure but of the partition structure so there is formed a unitary structural unit by which the wall structures are all formed. The upper parts of the partitions have the girt members and the filler members similar to those shown in Figure 10 with relation to the outer wall member and its adjacent foraminous wall member. The number of partitions may be multiplied; the size of the container may be varied to suit needs and conveniences.

It will be understood that I desire to comprehend within my invention such modifications as come within the scope of my claims and my invention.

Having thus fully described my invention, what I claim as new and desire to secure by Letters Patent, is

1. In a hay storage and ventilating apparatus, the combination with an imperforate wall, of a U-shaped girt within the same and a wooden filler mounted in said girt, the filler and girt being circumferential, a foraminous wall inside of said girt and filler, and means within the imperforate wall to support the foraminous wall.

2. In a hay storage and ventilating apparatus, the combination with an outer imperforate wall and an inner foraminous wall, of a U-shaped girt and a wooden filler therein, and another U-shaped girt with its wooden filler; such girts with their fillers being within the outer wall and without the foraminous wall.

3. In a hay storage and ventilating apparatus, the combination with an outer imperforate wall having corrugations and an inner foraminous wall also corrugated, of an annular U-shaped girt and its wooden filler adjacent the inside of the outer wall, and another annular U-shaped girt with its wooden filler adjacent the outer surface of the foraminous wall.

4. In a hay storage and ventilating apparatus, the combination with an outer imperforate wall, an annular U-shaped girt having a wooden filler, of a foraminous wall inside of said girt and filler, and another annular U-shaped girt having a wooden filler located adjoining the foraminous wall, and a U-shaped filler and connector located between the two girts.

JOHN G. SHODRON.